(12) United States Patent
Major et al.

(10) Patent No.: US 6,990,512 B1
(45) Date of Patent: Jan. 24, 2006

(54) METHOD AND SYSTEM FOR USING LIVE TIME SHIFT TECHNOLOGY TO CONTROL A MULTIMEDIA FILE

(75) Inventors: Robert D. Major, Orem, UT (US);
Yuemin Yang, Draper, UT (US);
Steven D. Lowry, Orem, UT (US);
Richard M. Keene, Park City, UT (US)

(73) Assignee: Novell, Inc., Provo, UT (US)

( * ) Notice: Subject to any disclaimer, the term of this patent is extended or adjusted under 35 U.S.C. 154(b) by 746 days.

(21) Appl. No.: 09/860,249

(22) Filed: May 18, 2001

Related U.S. Application Data

(63) Continuation of application No. 09/811,968, filed on Mar. 19, 2001, now abandoned.

(51) Int. Cl.
*G06F 15/16* (2006.01)

(52) U.S. Cl. ...................... 709/203; 709/219

(58) Field of Classification Search ............... 709/203, 709/217–19, 23–24, 27–29, 31, 219; 711/133, 711/159, 118
See application file for complete search history.

(56) References Cited

U.S. PATENT DOCUMENTS

| | | | | |
|---|---|---|---|---|
| 6,014,706 A | * | 1/2000 | Cannon et al. ............. | 709/231 |
| 6,167,438 A | * | 12/2000 | Yates et al. ................. | 709/216 |
| 6,407,680 B1 | * | 6/2002 | Lai et al. ...................... | 341/50 |
| 6,598,075 B1 | * | 7/2003 | Ogdon et al. ............... | 709/204 |
| 6,678,791 B1 | * | 1/2004 | Jacobs et al. ............... | 711/118 |
| 6,721,850 B2 | * | 4/2004 | Hofmann et al. ........... | 711/133 |
| 6,728,753 B1 | * | 4/2004 | Parasnis et al. ............. | 709/203 |
| 6,728,763 B1 | * | 4/2004 | Chen .......................... | 709/219 |
| 2002/0112004 A1 | * | 8/2002 | Reid et al. .................. | 709/205 |
| 2002/0124100 A1 | * | 9/2002 | Adams ....................... | 709/232 |

* cited by examiner

*Primary Examiner*—Krisna Lim

(74) *Attorney, Agent, or Firm*—Haynes and Boone, LLP

(57) ABSTRACT

A method and system is disclosed for controlling real time presentation session through a communication network using control features embedded in a predetermined presentation software such as QuickTime Player. An original media server is first located for streaming a media file therefrom to present a real time presentation session. An Internet Cache System is situated between the original media server and the presentation tool having the presentation software. During a handshake communication process among the original media server, the Internet Cache System and the presentation software, a session description information sent by the original media server for the forthcoming presentation session is modified so as to make the presentation software deem the presentation session as a non-live presentation session.

22 Claims, 2 Drawing Sheets

METHOD AND SYSTEM FOR USING LIVE TIME SHIFT TECHNOLOGY TO CONTROL A MULTIMEDIA FILE

CROSS REFERENCE

This application is a continuation of U.S. patent application Ser. No. 09/811,968, filed on Mar. 19, 2001, now abandoned, having the title "Method and System for Using Live Time Shift Technology to Control a Multimedia File."

BACKGROUND OF THE INVENTION

The present invention relates generally to computer software, and more particularly, to a system and method for controlling multimedia files for a live data streaming process in a network environment.

In a networked environment where communication links connect multiple computers or other communication devices, information can be exchanged among the computers in the form of data files in various formats. For example, consider two computers connected together through a network. A multimedia data file may be transferred or downloaded from the second computer to the first computer so that the first computer can "play" the file. In order to play a multimedia data file in the first computer, presentation software must be used. Common examples of presentation software include Apple Computer's QuickTime Player software and Microsoft's MediaPlayer software. In these examples, the data file is stored temporarily or permanently on the first computer. As a result, the presentation software can control the file so as to implement control features such as fast forward, rewind, pause, etc.

With the advancement of technology, the data file does not have to be completely downloaded to the first computer before the playing. "Data streaming" technology allows the downloading and playing process to be carried out practically at the same time. There are two general technologies for data steaming: stored media streaming and live media streaming. Stored media streaming stores the data file being transferred, but allows the first computer to start playing the data file before it is completely downloaded. For stored media streaming, the control features (e.g., pause, rewind, fast forward) of the presentation software can be fully used.

Live media streaming is a technology for broadcasting a data file, such as broadcasting a live football event. Live media streaming does not store the data file in the first computer. Therefore, the control features of the presentation software can not be used fully. For example, the presentation software can not rewind the presentation to a certain time in the past because the data file is not stored in the first computer. As a result, the presentation software will deactivate its control features on its user interface. The user thus has no choice but to passively view the broadcasted presentation.

What is needed is an efficient method and system for controlling the data file in a live media streaming process.

SUMMARY OF THE INVENTION

A system and method is disclosed for allowing a first computer to selectively control a live media streaming presentation provided through a communication network. In one embodiment, the first computer controls the presentation using control features embedded in a predetermined presentation software. An original media server is provided for streaming a media file to present a live time presentation session. An Internet Cache System (ICS) is situated between the original media server and a presentation tool having the presentation software. During a handshake communication process between the original media server, the ICS, and the presentation software, session description information and other related information sent by the original media server for the upcoming presentation session is modified in the ICS so as to make the presentation software interpret the presentation session as a non-live presentation session (e.g., a stored media streaming presentation).

Presentation data is streamed from the original media server to the ICS and stored/cached on the ICS. The presentation software can retrieve the stored presentation data and present the live time presentation session as if it is presenting a stored non-live session. Some existing control features such as the rewind, forward, pause, and stop buttons can not be used for the live time presentation.

DESCRIPTION OF THE PREFERRED EMBODIMENT

Figure 1:
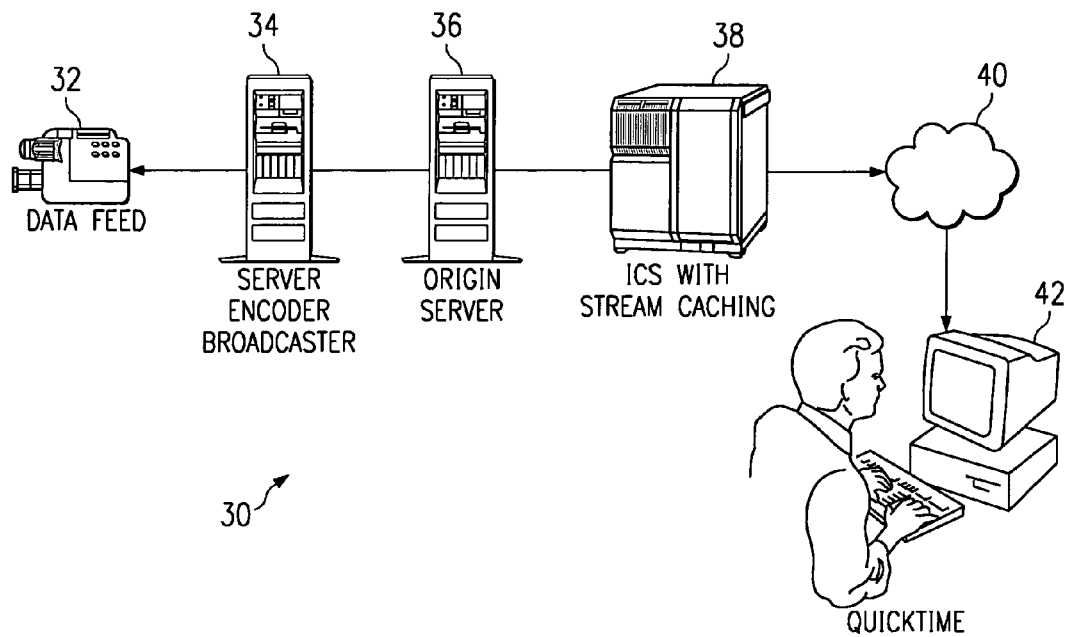
FIG. 1 illustrates a network schematic showing one implementation for streaming and displaying data.

Referring to FIG. 1, an exemplary network-based computer system for implementing a data streaming presentation is designated with the reference numeral 30. The computer system 30 includes a plurality of computer components, each of which including hardware (e.g., memory, processor, and interfaces) and software (e.g., operating system) typically found in a computer. It is understood that the illustrated computer components represent many types of computers, including personal digital assistants, wireless telephones, and laptop computers. The computer system 30 also includes a plurality of networking components. It is understood that many types of networks exist, using various different wired and/or wireless technologies.

Taking a live multi-media presentation as an example, source data for the presentation is captured or recorded by an electronic instrument such as a video camera 32. The captured data is then sent to a server containing an encoding module (the "encoder") 34. The encoder 34 serves the function to convert the format that the captured data is in into a compressed and displayable format determined by the hardware and software configuration of the presentation. Since the encoding process is computing resource intensive, another streaming server may be needed. For instance, the encoded data may be further sent to an original media server 36, which stores and provides the encoded data upon request to other networked computers or other presentation instruments. Connecting to the original media server 36 is a Network Cache System (NCS) (e.g., an Internet Cache System (ICS) for using the Internet for a live time media streaming) 38 with data stream cache that serves as a buffer to store any incoming data for temporary use. A network environment such as the Internet 40 serves the purpose of further distributing or broadcasting the data to each receiver 42 who uses a communication device such as a personal computer to view the multi-media presentation. The receiver 42 includes presentation software to view the transmitted data for the presentation. It is understood that the presentation software should be conversant with the data captured and encoded by the encoder 34. The combination of the receiver 42 and the presentation software will be generally referred to as a media player 56.

Figure 2:
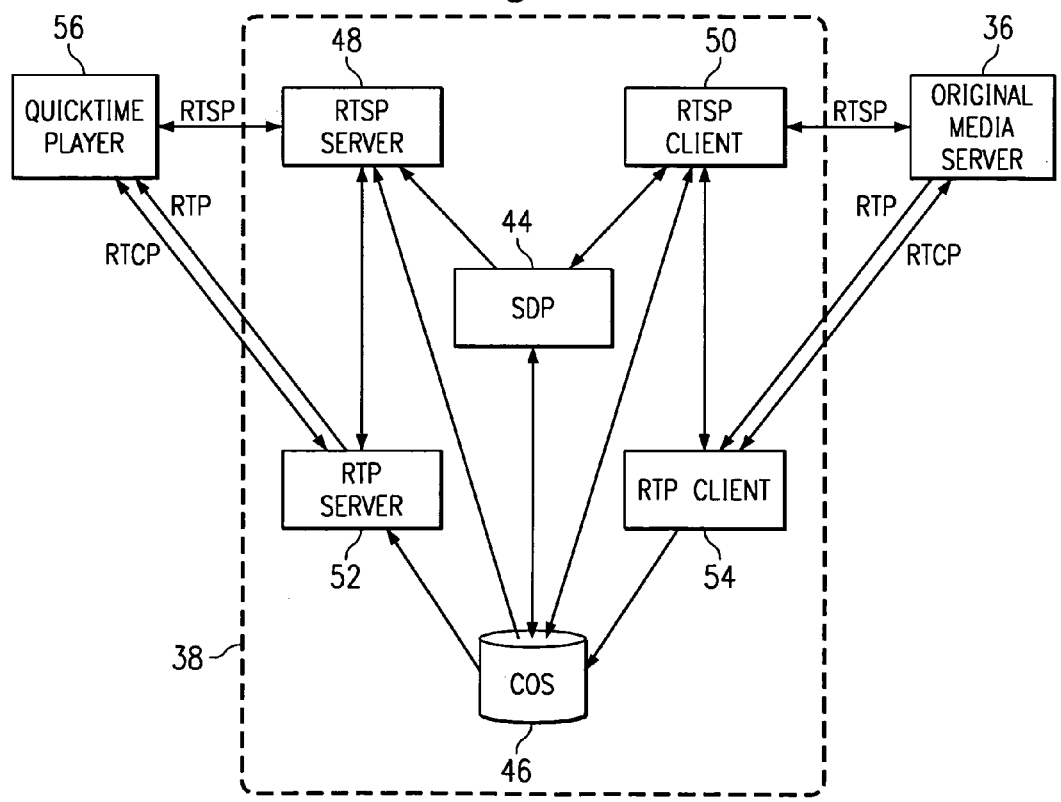
FIG. 2 illustrates a block diagram showing various component modules in the Internet Cache System (ICS) of FIG. 1 according to one example of the present invention.

Referring to FIG. 2, in one embodiment, the ICS 38 includes a Session Description Protocol (SDP) module 44, a Cache Object Storage (COS) module 46, a Real Time Streaming Protocol (RTSP) server 48 and its RTSP client 50, and a Real Time Transport Protocol (RTP) server 52 and its corresponding RTP client 54. The function of the SDP module 44 is to analyze an incoming message and send appropriate information to various recipients such as the RTSP server 48 or the COS module 46. The primary function of COS module 46 is to store critical data that need to be stored temporarily. One typical example of such data is the streamed audio or video data to be presented. The ICS 38 is connected to the media player 56. The ICS also interacts with the original media server 36, which feeds the ICS with the streaming data to be displayed by the media player 56.

Figure 3:
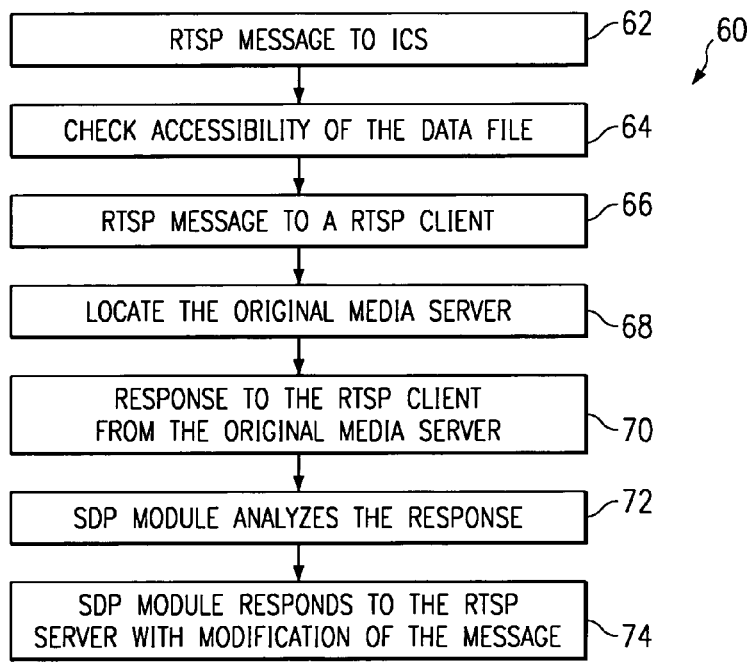
FIG. 3 is a flow diagram illustrating a handshake process among a presentation software, the ICS, and an original media server according to one example of the present invention.

Referring to FIG. 3, a handshake process 60 may be used between the media player 56, the ICS, and the original media server 36, according to one example of the present invention. When a presentation is initiated in step 62, the media player sends a RTSP message to the ICS. Such an initiation message requests the ICS to describe information about the data streaming to the media player (and such a message is referred as a "Describe" message and the present handshake process is also referred to as a "DESCRIBE handshake process") such as whether the data is for a live time session or how many audio/video tracks for the incoming data. After the RTSP server in the ICS receives this Describe message, in step 64 the COS is checked to see whether the data to be presented is currently located in the ICS and whether it is accessible by the media player. If the media data to be streamed is previously cached into the COS, the RTP server will get the media data from the COS, and subsequently send the media data to the media player eventually. If the data is not located in the COS, then in step 66 the RTSP client will initiate a new session with an appropriate original streaming server to retrieve the requested data based on the location information (e.g., a URL on the Internet) provided by the media player (step 68). The original media server responds with an RTSP Describe Response message, which contains SDP information, to the RTSP client indicating certain information for the forthcoming presentation (step 70). Because this response message contains SDP information, it is also referred to as an SDP message. Once this SDP message is received by the RTSP Client, it is forwarded to the SDP module for analyzing the contents of the SDP message in step 72. The SDP message is then parsed by the SDP module, and appropriate actions are taken by the SDP module. For example, the SDP module may save the SDP message in its entirety or any extracted information from the SDP message in the COS. More importantly, it saves a flag (e.g., a timing tag) in the COS indicating whether the media data is for a live time session or not. Therefore, this flag helps the RTSP server later to tell whether the stored media data is for a live time session (in step 74). As stated above, in the conventional method, if the SDP module indicates that it is a live session, the RTSP server sends a message to the media player to indicate the same, and the media player will deactivate the control buttons automatically.

According to one example of the presentation, the SDP module intelligently changes the session description information (e.g. the timing tag in the SDP message) before it is saved in the COS, so that the RTSP server, RTP server and the corresponding media player such as the media player will consider the upcoming live session as a normal stored media session. Relevant sections of the message that the SDP module saves to the COS indicating the upcoming live session is shown below. The original SDP message may read like the following:

```
/*Example of original SDP message:/
v=0
s=menace00_hinted.mov
e=http://kalki.sjf.novell.com/
e=root@kalki.sjf.novell.com
c=IN IP4 130.57.86.40
a=control:/
a=x-qt-text-cpy:1¾ © 1998 Lucasfilm, Ltd.
a=x-qt-text-des:Star Wars Episode 1 Movie Trailer      "The Phantom
Menace".
a=x-qt-text-req:Performs best on fast G3/Pentium II computers or slower
machines scaled down to 320×141. Best viewing is on a fast CPU at
480×212, 640×283, or scaled higher in MoviePlayer by using "Present
Movie"up to 960×424 (doubled).
a=x-qt-text-cmt:Converted to QuickTime 3 by RDW,    Apple Computer,
Inc. 1/99
a=x-qt-text-src:Beta SP
a=x-qt-text-swr:QuickTime 3 Pro               Media Cleaner Pro
Sorenson Developer Edition
a=x-qt-text-mod:v.24-212/b1
a=range:npt=0–0 (or, t=3159876032 0)
m=audio 0 RTP/AVP 96
a=rtpmap:96 X-QT/22050/2
a=control:trackID=3
m=video 0 RTP/AVP 97
a=rtpmap:97 X-SorensonVideo/90000
a=control:trackID=4
```

After the modification, the same section of the message appears as follows:

```
/*Example of modified SDP message:/
v=0
s=menace00_hinted.mov
e=http://kalki.sjf.novell.com/
e=root@kalki.sjf.novell.com
c=IN IP4 130.57.86.40
a=control:/
a=x-qt-text-cpy:1¾ © 1998 Lucasfilm, Ltd.
a=x-qt-text-des:Star Wars Episode 1 Movie Trailer      "The Phantom
Menace".
a=x-qt-text-req:Performs best on fast G3/Pentium II computers or slower
machines scaled down to 320×141. Best viewing is on a fast CPU at
480×212, 640×283, or scaled higher in MoviePlayer by using "Present
Movie"up to 960×424 (doubled).
a=x-qt-text-cmt:Converted to QuickTime 3 by RDW,    Apple Computer,
Inc. 1/99
a=x-qt-text-src:Beta SP
a=x-qt-text-swr:QuickTime 3 Pro               Media Cleaner Pro
Sorenson Developer Edition
a=x-qt-text-mod:v.24-212/b1
a=range:npt=0–86400 (or, t=3159876032 3159962432)
m=audio 0 RTP/AVP 96
a=rtpmap:96 X-QT/22050/2
a=control:trackID=3
m=video 0 RTP/AVP 97
a=rtpmap:97 X-SorensonVideo/90000
a=control:trackID=4
```

Referring specifically to the two lines of code:
a=range:npt=0– 0 (or, t=3159876032 0), and
a=range:npt=0– 86400 (or, t=3159876032 3159962432), The two variables for the parameter "npt" indicate the starting and ending time of the media data to be played. In a live session, the npt is denoted as from 0 to 0, and by changing the ending time to a specific value such 86400 in the above example, it gives the pretence that the upcoming session is not a live presentation session. In one example, the variable number 86400 is selected based on the size of the COS for caching the media data. This number can also be selected randomly. In the case that a "t tag" is used, the NTP (Network Time Protocol) time range (e.g., 3159876032-0) for a live time session is changed to a disguising range (e.g., 3159876032-3159962432).

When the modified version of the SDP message is forwarded by the RTSP server to the media player in step 74, the media player also views the upcoming live time session as a stored media (non-live) session. Since the media player views the live time session as a stored media session, it will not disable its control buttons which allow fast forwarding, pause, fast rewind, etc.

Once the DESCRIBE handshake process is completed, a channel SETUP process may be performed. The SETUP process between the media player and the ICS determines what is the preferred transport mechanism therebetween for streaming the media data, and it includes a setup request and a setup response. For example, the setup request and setup response confirm the agreed transport mechanism, assigned session ID, and ports involved. This SETUP process ensures that all established media tracks (e.g., audio/video tracks) are associated to the same session by a session ID from the RTSP server. Similarly, the ICS, or the RTSP server in particular, serves as a proxy and further communicates with the original streaming server for setting up their transport mechanism.

After the SETUP process is fully finished, a PLAY process starts. The PLAY process contains generally a play request and a play response between the media player and the RTSP server. The play request sent by the media player tells the original media server to start sending data via the transport mechanism as specified in the SETUP process. Upon receiving a confirmation from the RTP server that the media data is accessible from the COS, the play response is sent back to the media player from the RTSP server. Then, the RTP server fetches the data in the form of data packets from the COS and feeds them to the media player. Since the play response usually includes the first packet's RTP timestamp and sequence number for all tracks for a stored media data session, to change a live time session to a stored media session, the play response has to be changed to include the packet's RTP timestamp and sequence number. The RTSP server will make appropriate changes by inserting the information (e.g., the first packet's timestamp, sequence number, etc.) obtained from the RTP server. There is similar Play process between the ICS and the original media server, from which the media data is sent to the ICS in a live time fashion. However, the play response from the original media server does not have any information similar to the RTP timestamp and sequence number due to the nature of a live time session. Therefore, while the ICS feeds the media player with the cached media data, the original media server or streaming server will keep sending out the media data to the RTP/RTCP client of the ICS. As described above, the media data received by RTP client will then be saved to the COS. For a live time session, the play response from the original media server also includes an RTP synchronization source (SSRC) information for identifying data packets coming from a same source. There is a RTP header in each packet, which includes the RTP timestamp, sequence number and SSRC among other things.

With the above-described mechanism, when the live session is presented, the media player "believes" that it is a stored media session. If the user chooses to rewind the session to an earlier point in time, he may do so up to the amount of the media data that the COS caches. For instance, if the COS module caches various sections of the media data from section 1 to 10, and section 10 is being played at the present time, the user is able to rewind the session back to section 1, but not anything prior to section 1.

Figure 4:
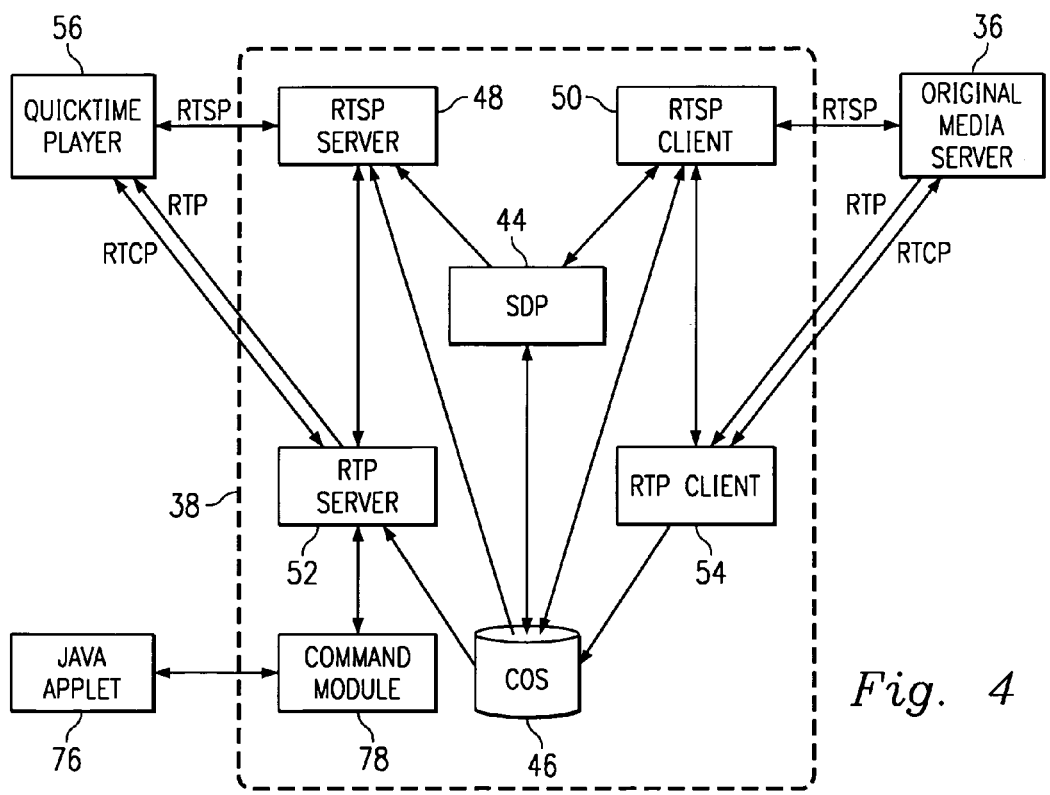
FIG. 4 illustrates a block diagram showing various component modules in the Internet Cache System (ICS) of FIG. 1 according to another example of the present invention.

Referring to FIG. 4, communications among the media player 56, the ICS 38, and the original media server 36 are used to control a live presentation session. In this embodiment, a separate control module is programmed to allow the live session to be controlled disregarding the control features of the presentation software. One reason for implementing such an embodiment is that existing presentation software (used by the media player 56) will disable their control panels when a live session is detected. An example is illustrated below in more detail using the media player 56 to represent all the presentation software. When the media player 56 initiates a media streaming session by sending a RTSP Describe request to the ICS 38, the RTSP server 48 receives the Describe request, and checks with the COS to see whether the media data sought for is accessible from the COS at the moment. If it is not, the RTSP client 50 sends out the request to an original media server 36. The original media server 36 responds with an SDP message to the RTSP client 50, which indicates that the upcoming presentation is a live session or not. The SDP module 44 processes the SDP message, saves a copy of the message or a part of that in the COS 46, which is accessible by the RTSP server 48 or further sent on to the media player 56. Once receiving this message, the media player 56 starts a live session presentation. Because the media player 56 believes it is going to play a live session, it disables its play controls on its control panel which normally includes fast forward, fast rewind, etc. Since these controls do not function at all during the presentation, a separate program module is used to manage the live time shift operations.

In one example, a Java Applet 76 is used to send a request to a Command Module 78 inside the ICS 38 that is connected to the RTP server 52. The request is used to obtain information about the amount of media data cached in the COS 46. This information not only shows how much data is cached in the COS 46, but it allows the user to move backward in time to the extent permitted by the data cached. That is, the user can only move back to the beginning of the cached data or forward to the current point of the data stream. With each user-time-shift command that is sent from the Java Applet 76, the Command Module 78 instructs the RTP server that there is a time shift operation. Since all live packets in the RTP traffic must have a unique, incrementing timestamp and a sequence number, the RTP Server 52 changes the timestamps and sequence numbers according to the time shift commands and send the "disguised" packets further to the media player 56.

In addition, whenever the time shift command is issued from the Java Applet 76, the Command Module 78 also sends a reply message back to the Java Applet 76 informing the Java Applet 76 about the newly cached data in the COS 46. If no commands have been sent from the Java Applet 76, after a certain time interval, the Java Applet 76 will independently request the data information in the COS 46 so it can update its display.

In a more specific example, if the user has been watching a live presentation for 10 minutes and then sends a command to move the presentation 5 minutes back in time, the Java Applet 76 will send a 5 minutes time-shift command to the Command Module 78. The Command Module 78 will forward this request to the RTP Server 52. The RTP Server 52 will retrieve the stored video data that was presented five minutes earlier from the COS 46 and replace the timestamp and sequence number with appropriate logical numbers that the media player 56 is expecting. With these changes, it would then forward that data to the media player 56. From the perspective of the media player 56, it is still receiving a live stream even though the actual stream being displayed is the data that has been presented before.

The present invention enjoys various advantages. One is that existing presentation software does not have to be reconfigured to control the live session. As explained above, all the control buttons/features of the presentation software can be seamlessly used with any original media server through the ICS.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for controlling a live time presentation session through a communication network using control features embedded in a presentation software, the method comprising:
    providing an original media server for streaming media data to present a live time presentation session through a network cache system (NCS); and
    before storing the streaming media data in the NCS, modifying, by the NCS, a timing tag portion of session description information sent by the original media server for the presentation session so as to make the presentation software deem the presentation session as a non-live presentation session and perform the live time presentation.

2. The method of claim 1 wherein the step of providing further includes the steps of:
    establishing a first communication process between the original media server and the presentation software through the NCS for exchanging session description information for a live presentation session; and
    establishing a second communication process between the presentation software and the original media server through the NCS for initiating the live presentation session.

3. The method of claim 2 the step of establishing a first communication session further includes:
    determining whether the media data is cached in and accessible from the NCS; and
    if the media data is not accessible from the NCS, identifying the original media server on which the media data is located.

4. The method of claim 2 wherein the step of establishing the second communication process further includes inserting, by the NCS, a time stamp and sequence number to at least one data packet received from the original media server before it is sent out to the presentation software.

5. The method of claim 2 wherein the NCS has a cache object storage module for storing the media data streamed from the original media server.

6. The method of claim 2 wherein the first communication process uses a session description protocol.

7. The method of claim 1 further comprising changing a time stamp and a sequence number of a selected segment of the media data cached in the NCS when a user uses the control feature of the presentation software to restart the live time presentation session from a presentation point corresponding to the selected segment.

8. A method for controlling a live time presentation session through a communication network using control features embedded in a presentation software, the method comprising:
    providing an original media server for streaming media data to present a live time presentation session through a network cache system (NCS), the step of providing comprising:
        establishing a first communication process between the original media server and the presentation software through the NCS for exchanging session description information for a live presentation session and
        establishing a second communication process between the presentation software and the original media server through the NCS for initiating the live presentation session;
    modifying a portion of session description information sent by the original media server for the presentation session so as to make the presentation software deem the presentation session as a non-live presentation session and perform the live time presentation; and
    establishing a third communication process, after establishing the first communication process, between original media server and the presentation software through the NCS for determining a first data transport mechanism between the presentation software and the NCS, and a second data transport mechanism between the NCS and the original media server.

9. A network cache system for controlling a live time presentation session using control features embedded in a predetermined presentation software, the system comprising:
    a real time streaming protocol (RTSP) server and at least one of its clients for intelligently assisting communication between the presentation software and an original media server for streaming media data therefrom to present the live time presentation session;
    a session description protocol (SDP) module for analyzing and modifying a session description information in one or more messages (SDP messages) sent by the original media server for the presentation session so as to make the presentation software deem the presentation session as a non-live presentation session, the session description protocol module comprising:
        means for parsing the SDP messages;
        means for modifying a timing tag of the SDP messages to indicate that the presentation session is a non-live presentation session; and
        means for storing the parsed and modified SDP message to a memory storage module; and
    a real time transport protocol (RTP) server and at least one of its clients for delivering the media data to the presentation software for the live presentation session, wherein the SDP message, the analyzed and modified session description information, and the media data is stored temporarily in a memory storage module accessible by the SDP module, the RTSP server and its clients, and the RTP server and its clients.

10. The system of claim 9 wherein the RTSP server and its clients assist the presentation software and the original media server for implementing a first communication process to determine whether the media data is for a live time presentation session and a second communication process for determining a preferred data transport mechanism.

11. The system of claim 9 wherein the memory storage module is a cache object storage.

12. The system of claim 9 wherein the media data stored in the memory storage module is assigned with one or more time stamps and sequence numbers when the media data is retrieved by the RTP server for feeding the presentation software.

13. The system of claim 12 wherein the RTP server changes the assigned sequence numbers and the time stamps when one of the control features of the presentation software is invoked for implementing a live time shifting feature.

14. A method for controlling a live time presentation played by a presentation software through a communication network, the method comprising:
controlling the live time presentation by using control features of the presentation software for shifting the live time presentation forward or backward in time;
manipulating a timing tag portion of a session description information, before media data for the live time presentation is sent to the presentation software, to indicate that the presentation is a not a live time session;
storing the manipulated session description information in a memory storage module; and
dynamically adjusting a time stamp and sequence number of at least one packet of the media data when the live time presentation is shifted backward or forward, wherein the step of dynamically adjusting preconditions the media data to be presented in the live time presentation and makes the presentation software unable to detect the adjustment.

15. The method of claim 14 wherein the step of manipulating is done by a message processing module receiving and analyzing session description information from an original media server, the processing module using a predetermined session description protocol.

16. The method of claim 15 wherein the message processing module further stores the analyzed session description information in the memory storage module.

17. The method of claim 14 wherein the step of adjusting is implemented by a data processing module using a real time streaming protocol.

18. The method of claim 14 wherein shifting the live time presentation backward is limited by the media data cached in a memory storage module.

19. A method for controlling a live time presentation session through a communication network using control features embedded in a presentation software, the method comprising:
locating an original media server for streaming media data to present a live time presentation session through a network cache system (NCS);
establishing a first communication process between an original media server and the presentation software through the NCS for exchanging session description information for the live presentation session;
establishing a second communication process between the presentation software and the original media server through the NCS for initiating the live presentation session;
modifying a timing tag portion of the session description information sent by the original media server for the presentation session so as to make the presentation software deem the presentation session as a non-live presentation session and perform the live time presentation; and
changing a time stamp and a sequence number of a selected segment of the media data cached in the NCS when a user uses the control feature of the presentation software to restart the live time presentation session from a presentation point corresponding to the selected segment.

20. A method for controlling a live time presentation session through a communication network using control features embedded in a presentation software, the method comprising:
locating an original media server for streaming media data to present a live time presentation session through a network cache system (NCS);
establishing a first communication process between an original media server and the presentation software through the NCS for exchanging session description information for the live presentation session, wherein if the media data is cached in and accessible from the NCS, the media data is sent to the presentation software;
establishing a second communication process between the presentation software and the original media server through the NCS for initiating the live presentation session;
modifying a timing tag portion of the session description information sent by the original media server for the presentation session so as to make the presentation software deem the presentation session as a non-live presentation session and perform the live time presentation; and
changing a time stamp and a sequence number of a selected segment of the media data cached in the NCS when a user uses the control feature of the presentation software to restart the live time presentation session from a presentation point corresponding to the selected segment.

21. The method of claim 2 wherein establishing a first communication session further includes:
determining whether the media data is cached in and accessible from the NCS; and
if the media data is accessible from the NCS, sending the media data to the presentation software.

22. The method of claim 2 wherein the second communication process is established after at least a portion of the media data is sent to the original media server.

* * * * *